July 1, 1969  L. M. SIERACKI  3,452,768
VORTICAL COMPARATOR

Filed Oct. 27, 1966  Sheet 1 of 2

INVENTOR,
LEONARD M. SIERACKI
BY Harry M. Saragovitz,
Edward J. Kelly, Herbert Berl
& J. D. Edgerton
ATTORNEYS July 1, 1969  L. M. SIERACKI  3,452,768
VORTICAL COMPARATOR
Filed Oct. 27, 1966
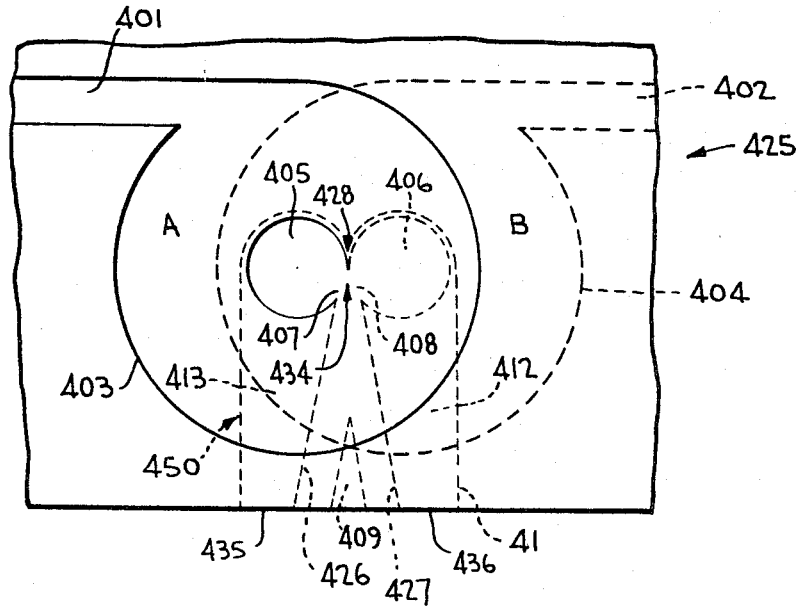
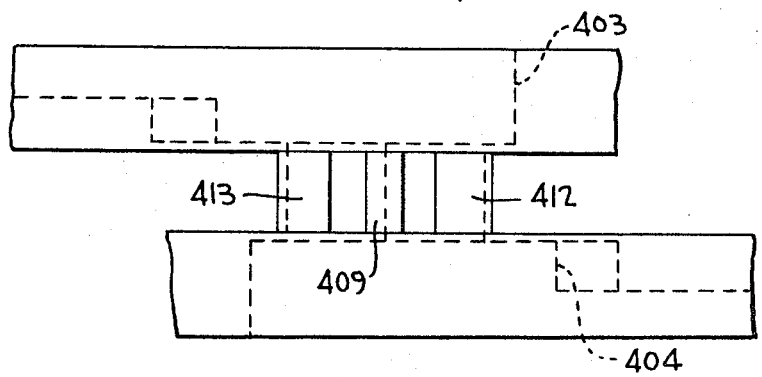
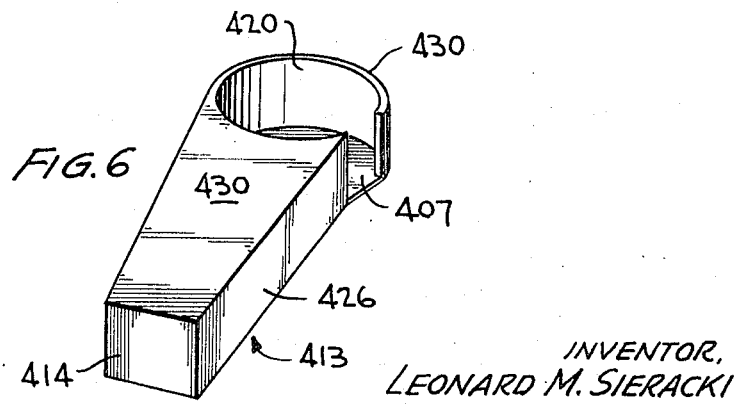
INVENTOR,
LEONARD M. SIERACKI
BY Harry M. Saragovitz
Edward J. Kelly, Herbert Berl
& J. D. Edgerton
ATTORNEYS

United States Patent Office 3,452,768
Patented July 1, 1969

3,452,768
VORTICAL COMPARATOR
Leonard M. Sieracki, Beltsville, Md., assignor to the United States of America as represented by the Secretary of the Army
Filed Oct. 27, 1966, Ser. No. 590,103
Int. Cl. G01p *3/30;* F15c *1/14*
U.S. Cl. 137—38                    7 Claims

ABSTRACT OF THE DISCLOSURE

A device providing a fluid output which is indicative of angular velocity. An angular velocity is superimposed on two vortices having opposite senses of rotation. The vortex rotating in the same direction as said angular velocity is increased in momentum, and the momentum of the other vortex is correspondingly decreased. Tangential flows issuing from each vortex are caused to collide. Fluid will then flow through each of two output passages depending on the relative momenta of the fluids issuing from each vortex.

---

This invention relates to fluid amplifiers and more particularly to a fluid amplifier capable of detecting an angular rate and providing a signal indicative of the rate.

In many different control situations the measurement of angular rate is of great importance. An example would be in aircraft flight where angular rate measurement is important for automatic and flight control systems. Similarly, in the weapons field it is sometimes of great importance to be able to determine the angular rate of the projectile to provide a control thereof.

Vortex rate sensors are known in the art as one means to detect an angular rate. The typical vortex rate sensor provides a fluid flow field which closely approximates the classical two-dimensional pure sink flow in the absence of an input rate. The fluid flow in pure sink flow has only a radial velocity. When the vortex rate sensor is subjected to an angular velocity or input rate, a pure vortex flow having only tangential or rotational flow is superimposed upon the pure sink flow. The effect of the superposition of the vortex flow upon the pure sink flow can be measured to provide an indication of the angular velocity the vortex sensor is subjected to.

Devices such as these, while providing a satisfactory angular rate measurement in some situations, do not provide as accurate a measurement as would be desired. Applicant has provided novel means to utilize the effect of angular rate on a vortex rate sensor to provide an extremely accurate indication of the angular rate not available in prior art devices.

It is therefore an object of the present invention to provide an improved vortex rate sensor.

It is a further object of the invention to provide a device having a fluid output which is indicative of an angular velocity.

These and other objects and advantages of the present invention will become apparent to those skilled in the art, from the following description when read in conjunction with the accompanying drawing, wherein:

FIGURE 4 is a top view of a third embodiment of the invention.

FIGURE 5 is a front view of the embodiment of invention as shown in FIGURE 4.

FIGURE 6 is an illustration of an element used in the embodiment of the invention of FIGURES 4 and 5.

In an illustrative embodiment of the present invention an angular rotation is imposed on two vortices having opposite senses of rotation. The vortex rotating in the same direction as the angular rate will be strengthened in accordance with the magnitude of the angular rate while the vortex rotating in the opposite direction will similarly be weakened. A fluid output indicative of the relative vortex strength, and hence the angular rate magnitude, is obtained.

Figure 1:
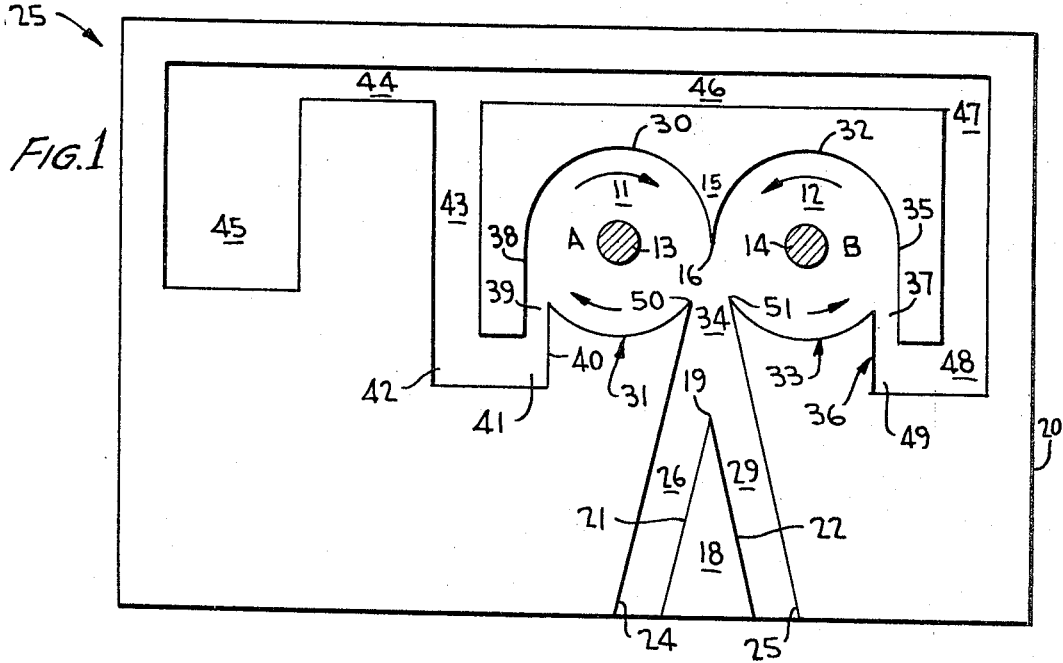
FIGURE 1 is a schematic illustration of one embodiment of the invention.

In FIGURE 1 a vortical comparator 125 has a body 20 having a left vortex chamber 11 and a right vortex chamber 12 formed therein. Each vortex chamber is circular and is equal in size to the other vortex chamber. A left center bar 13 and a right center bar 14 may be placed in the respective vortex chambers to improve the flow characteristics therein. Left vortex chamber 11 is defined by opposed cylindrical sections 30 and 31 while right vortex chamber 12 is defined by cylindrical sections 32 and 33. Cylindrical secitons 30 and 32 are adjacent each other and meet to form a guide 15 which has a point 16. Guide 15 is symmetrical to both vortex chambers and in a preferred embodiment of the invention is integral with body 20. A cusp 50 is formed at the portion of cylindrical section 31 nearest guide 15. A left side wall 24 extends from cusp 50 while a right side wall 25 extends from a cusp 51 on cylindrical section 33. The sidewalls diverge from each other and at their closest point are separated from each other by a throat 34. A three-sided splitter 18 having an apex 19 and a left side 21 and a right side 22 is symmetrically positioned between left sidewall 24 and right sidewall 25 and serves to define a left output passage 26 and a right output passage 29. Apex 19 is positioned near throat 34. While I have illustrated a three-sided splitter in the embodiment of FIGURE 1, it is obvious that other well known splitters having different geometrical shapes could be used. A source of pressure 45 by conduits 44 and 43, a right angle bend 42 and a second right angle bend 41 is directed tangentially into left vortex chamber 11 through a port 39. The pressure source 45 by conduits 44 and 46, a right angle bend 47, a second and third right angle bend 48 and 49, respectively is directed tangentially into right vortex chamber 12 by a port 37. As can be seen from FIGURE 1, port 39 communicates with left vortex chamber 11 tangentially on a left side 38 thereof to produce a vortex therein having a clockwise sense of motion. Port 37 communicates with right vortex chamber 12 tangentially on a right side 35 thereof to produce a vortex therein having a counterclockwise sense of motion.

Figure 2:
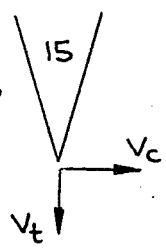
FIGURE 2 is a vector representation of the fluid velocity in FIGURE 1 as the fluid leaves a vortex chamber illustrated in FIGURE 1.

In normal operation with no angular rate applied to body 20 the strengths of the vortex in each chamber will be equal in magnitude but with the vortex in chamber 11 having a clockwise direction while the vortex in chamber 12 has a counterclockwise direction as previously described. Each vortex chamber will direct fluid against guide 15 and issue fluid from said chamber. The fluid will have a centrifugal velocity component Vc and a tangential velocity component Vt. The centrifugal velocity is a result of the rotation of the fluid in the vortex chamber while the tangential velocity is a result of guide 15 tangentially guiding the flow out the vortex chamber. A vector diagram of the velocity components of the fluid leaving left vortex chamber 11 can be seen in FIGURE 2. For equal strength vortices in each chamber, which is the case of no angular rate applied to body 20, the velocity of fluid leaving each chamber will be equal.

If no fluid were present in right vortex chamber 12 to retard the motion of the fluid discharging from left vortex chamber 11, the fluid from the latter chamber would be directed against right sidewall 25, because of its centrifugal velocity component, and issue from right output passage 29. A similar result with left output passage 26 would happen if no fluid were present in chamber 11 to retard the flow from right vortex chamber 12. As the fluid from one vortex chamber attempts to reach the opposite sidewall it impinges on the fluid from the other vortex chamber attempting to reach the sidewall opposite it. As the momentum of the fluids is equal, since they have equal velocities, the result will be a deflection of fluid from each vortex chamber from a direction to its opposite sidewall to a path equidistant from both sidewalls. Splitter 18 will then equally divide the flow and each output passage will receive an equal amount of fluid which will indicate a zero angular rate applied to body 20.

If body 20 has an angular rate applied thereto in the clockwise direction the vortices in the chambers 11 and 12 will no longer be of equal strength. The angular rate applied to body 20 is superimposed on the vortices in each vortex chamber. A clockwise angular velocity applied to body 20 will strengthen the vortex in chamber 11 since the fluid therein is rotating in a clockwise direction. The strength of the vortex in chamber 12 will similarly be diminished since the fluid therein is rotating in a counterclockwise direction which is opposite to the direction of rotation of body 20. Since the vortex in vortex chamber 11 is strengthened while the vortex in chamber 12 is weakened the fluid flowing from chamber 11 will have a higher velocity than that from chamber 12. As the resultant velocity from chamber 11 has a centrifugal velocity greater than that from chamber 12, the momentum of the fluid from chamber 11 in a radial direction will be greater than that from chamber 12, dominating the fluid from chamber 12 and resulting in a combined flow closer to right sidewall 25. Splitter 18 will divide the flow but since the fluid is closer to right sidewall 25 right output passage 29 will receive more fluid than left output passage 26 indicating a clockwise angular rate. It will be readily apparent that as the angular rate applied to body 20 is increased the strength of the vortex in one chamber is increased which will result in a greater deflection of flow toward one sidewall with a greater resultant fluid output in the output passage formed by the sidewall.

Figure 3:
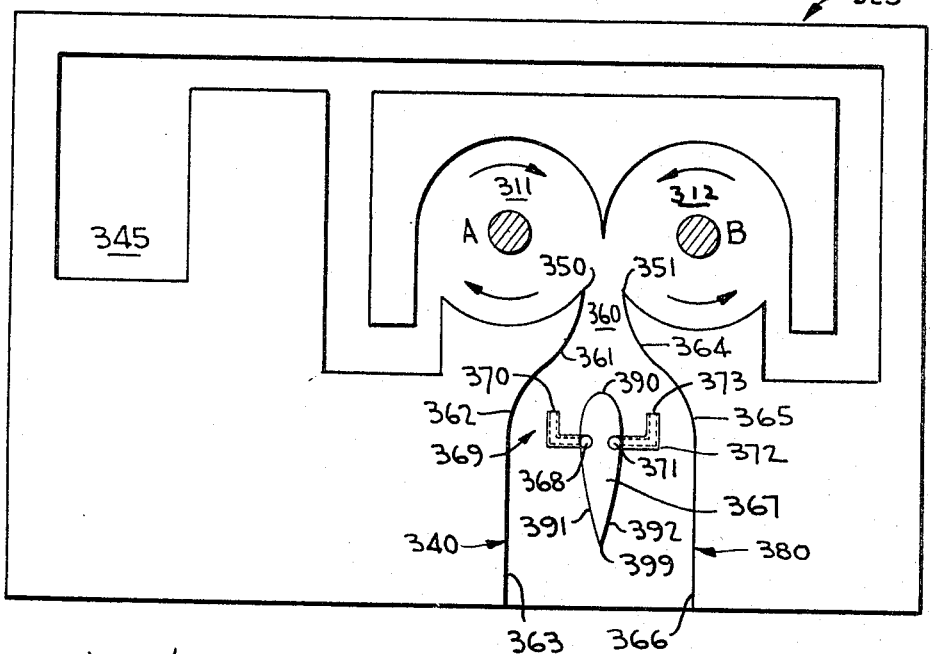
FIGURE 3 is a schematic representation of a second embodiment of the invention.

In FIGURE 3, elements identical to those of FIGURE 1 will have the same last two digits as those of FIGURE 1 only prefaced by the numeral 3. FIGURE 3 is identical to FIGURE 1 except for the means to compare the strength of the two vortices. In FIGURE 3 a left sidewall 340 is formed by a straight section 363 leading to a curved section 362 which leads to a second curved section 361. Curved sections 362 and 361 are inverted with respect to one another. Curved section 361 meets cusp 350 and serves to define the left side of a throat 360. Right sidewall 380 has a straight section 366, which is parallel to section 363, and a first curved section 365 and a second curved section 364, the latter meeting with a cusp 351. Curved sections 365 and 364 are located opposite to curved sections 362 and 361, respectively.

While I have shown the sidewalls of vortical comparator 325 as being curved in part, it will be obvious that other configurations can be used without departing from the scope of my invention. Symmetrically positioned between left sidewall 340 and right sidewall 380 is an airfoil 367 of conventional design, which has a leading edge 390 positioned adjacent throat 360. A left pressure port 368 leads to a left pressure tap 369 which has a left pressure receiving port 370 placed in the path of fluid on the left side 391 of airfoil 367. A right pressure port 371, a right pressure tap 372 and a right pressure receiving port 373 are similarly placed on a right side 392 of airfoil 367.

The operation of vortical comparator 325 of FIGURE 3 is similar to that of FIGURE 1. If no angular rate is imposed on the vortical comparator 325 the vortices in vortex chambers 311 and 312 will be of equal strength and the flow will hit airfoil 367 with a zero degree angle of attack. Airfoil 367 will evenly divide the flow and the pressure taps 369, 372, which can lead to pressure gages not shown, will detect equal magnitudes of pressure indicating no angular rate applied to vortical comparator 325. If an angular velocity is applied to vortical comparator 325 in the clockwise direction the vortex in chamber 312 will be strengthened while the vortex in chamber 311 will be weakened. This will cause the fluid from throat 360 to incline toward right sidewall 380, as previously described, and hit airfoil 367 with a negative angle of attack (measured from a vertical line passing longitudinally through the airfoil) causing more flow to be on right side 392 of the airfoil than the left side. The pressure taps 369, 372 will no longer detect equal magnitudes of pressure with tap 372 detecting a higher pressure than tap 369 because of the increased flow on the right side 392 of airfoil 367. Since the difference in pressures on the respective sides of the airfoil is a measure of the strength of the respective vortices which is an indication of the angular rate applied to the vortical comparator, it can be seen that pressure differences across taps 369 and 372 is a measurement of the angular rate applied to vortical comparator 325. When the fluid from the left side and right side of the airfoil traverses the length of the airfoil there may be seen an attachment of the fluids from the two sides of the airfoil or not according to principles well known in the art. It is obvious that for greater angular rates applied to the vortical comparator greater disparities in the strength of the respective vortices will result which will give increased differences in the magnitudes of the pressures detected by the respective taps. While I have disclosed pressure taps and an airfoil in FIGURE 3 for detecting different vortex strengths, it is obvious that a splitter could be positioned adjacent trailing edge 399 of airfoil 367 to provide a left and right output passage the flow in which would be an indication of the respective vortex strengths also.

In FIGURE 4 a vortical comparator 425 has an upper vortex chamber 403 and a lower vortex chamber 404 positioned below and to the right of the upper vortex chamber (FIGURE 5). A conduit 401 introduces fluid tangentially in upper vortex chamber 403 while a conduit 402 introduces fluid tangentially in lower vortex chamber 404. Each vortex chamber is of circular cross-section and equal in area to the other vortex chamber. A center port 405 is positioned in the bottom center of upper vortex chamber 403 and a center port 406 is similarly positioned in the upper center of lower vortex chamber 404. A left side member 413 is positioned below the upper vortex chamber 403. As can be seen in FIGURE 6, the left side member has a receiving port 420 which is the same size as center port 405 and is aligned with the center port. A discharge port 407 is formed by a break in the circumference of receiving port 420 and as seen in FIGURE 4 is adapted to discharge fluid tangentially from receiving port 420. The left side member 413 has a circular section in which receiving port 420 is formed and an extended section 430 which is tapered as seen in FIGURE 4 to end in a face 414. A left sidewall 426 is on one side of left side member 413. A right side member is positioned above lower vortex chamber 404 and is symmetrical to the left side member and a source of pressure 402, which is equal in magnitude to source 401, directs fluid tangentially into lower vortex chamber 404 while source 401 directs fluid tangentially in upper chamber 403. Right side member 412 is positioned adjacent left side member 413 (as seen in FIGURE 4) and above lower vortex chamber 404 with the discharge port of each side member adjacent the discharge port of the other side member. Guide surface 428 is formed from the circumference of the receiving ports of the respective side members and directs the fluid tangentially from each receiving port towards a splitter 409 which is positioned with its apex near a throat section 434. Splitter 409 serves to define a left output passage 435 and a right output passage 436. While a triangular shaped splitter and sidewall members having straight sides have been disclosed it is obvious that elements having other geometrical configurations could be used without departing from the scope of the invention. Upper and lower vortex chambers can be joined as shown in FIGURE 5 by applying an adhesive, or any other well known bonding material, to the top and bottom of the sidewall members and to the splitter.

In the operation of the embodiment of FIGURES 4, 5 and 6 a vortex flowing in the clockwise direction is created in upper vortex chamber 403 while a vortex having an opposite sense of direction is formed in lower vortex chamber 404. The fluid in the upper vortex chamber passes through center port 405, receiving port 420 of left sidewall member 430 and is tangentially directed out discharge port 407. Fluid from lower vortex chamber 404 is directed out center port 406 to the receiving port (not shown) of right sidewall member 427 and is tangentially directed out discharge port 408. It is believed that a further description of the operation of the vortical comparator of FIGURES 4 and 5 will be obvious from the foregoing disclosure.

I claim as my invention:
1. A device for detecting angular rate, comprising:
   (a) a body;
   (b) said body having two vortex chambers therein;
   (c) means for communicating pressure fluid to each of said vortex chambers to create vortices therein, each of said cortices having a sense of rotation opposite the other of said vortices;
   (d) an interaction chamber;
   (e) a discharge port in each of said vortex chambers, said discharge ports being adapted to issue tangential flow from each of said vortex chambers into said interaction chamber such that the flow from each of said vortex chambers impinges upon the flow from the other of said vortex chambers;
   (f) output means adapted to receive fluid flow from said interaction chamber and to divide said flow according to the relative momenta of the fluid flow issuing from each of said discharge ports.

2. A device according to claim 1 wherein said vortex chambers are in the same plane.

3. A device according to claim 1 wherein said vortex chambers are positioned in different planes.

4. The device of claim 1 in which said output means comprises a flow guiding body symmetrically placed between sidewalls which form said interaction chamber forming a left and a right output passage communicating with said interaction chamber.

5. A device according to claim 4 wherein said flow guiding body is a splitter.

6. A device according to claim 4 wherein said flow guiding body is an airfoil.

7. A device according to claim 6 where pressure indicating means are placed in said left output passage and right output passage.

References Cited

UNITED STATES PATENTS

| | | | |
|---|---|---|---|
| 3,171,422 | 3/1965 | Evans | 137—81.5 |
| 3,216,439 | 11/1965 | Manion | 137—81.5 |
| 3,261,209 | 7/1966 | Rae. | |
| 3,272,212 | 9/1966 | Bowles | 137—81.5 |
| 3,276,464 | 10/1966 | Metzger | 137—81.5 |
| 3,290,947 | 12/1966 | Reilly. | |
| 3,320,815 | 5/1967 | Bowles | 73—505 |
| 3,372,596 | 3/1968 | Keller | 73—505 |

SAMUEL SCOTT, *Primary Examiner*.

U.S. Cl. X.R.

73—505, 515; 137—81.5